United States Patent [19]

Trainor et al.

[11] Patent Number: 5,751,222
[45] Date of Patent: *May 12, 1998

[54] RECONFIGURABLE COMMUNICATIONS MODULE

[75] Inventors: John J. Trainor, Wake Forest; Carl J. Laplace; Michael A. Kinney, both of Raleigh; Joseph F. Reilly, Wendell, all of N.C.

[73] Assignee: Siemens Energy & Automation, Inc., Alpharetta, Ga.

[*] Notice: The term of this patent shall not extend beyond the expiration date of Pat. No. 5,646,610.

[21] Appl. No.: 774,003

[22] Filed: Dec. 26, 1996

Related U.S. Application Data

[63] Continuation of Ser. No. 414,066, Mar. 31, 1995, abandoned.

[51] Int. Cl.⁶ .................................................. H04Q 1/00
[52] U.S. Cl. ........................ 340/825.05; 340/825.79; 395/821
[58] Field of Search ....................... 340/825.05, 825.06, 340/825.07, 825.37, 825.79; 364/492, 188, 940, 926.93, 927.92; 395/325, 821; 379/102, 91

[56] References Cited

U.S. PATENT DOCUMENTS

| | | | |
|---|---|---|---|
| 4,567,557 | 1/1986 | Burns | 340/825.06 |
| 4,749,992 | 6/1988 | Fitzmeyer et al. | 340/825.07 |
| 4,899,217 | 2/1990 | MacFayden et al. | 379/102 |
| 4,918,589 | 4/1990 | Floro et al. | . |
| 4,964,058 | 10/1990 | Brown, Jr. | 364/492 |
| 4,972,463 | 11/1990 | Danielson et al. | 379/91 |
| 5,086,385 | 2/1992 | Launey et al. | 364/188 |
| 5,307,463 | 4/1994 | Hyatt et al. | . |
| 5,420,986 | 5/1995 | Baldwin et al. | 340/825.05 |

Primary Examiner—Edwin C. Holloway, III

[57] ABSTRACT

A reconfigurable communications module for power distribution and control apparatus is taught. Briefly stated, a communication module is rack insertable into a voltage regulator controller and has disposed therein a microprocessor board for communicating with host power distribution control apparatus and which also communicates with a transceiver board. The transceiver board may be one of several types of boards which provide a physical link with other equipment. Such boards may, for example, include a fiber optic, an RF based board, or a wire based board which is interchangeable in the communications module thereby allowing reconfiguration of the communication module to different media.

20 Claims, 3 Drawing Sheets

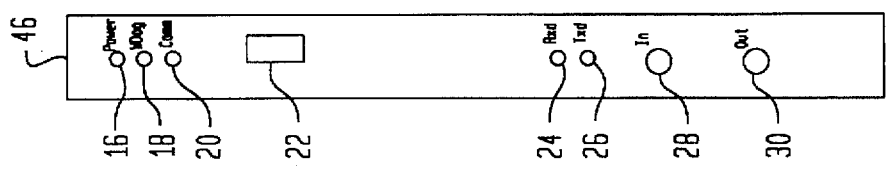
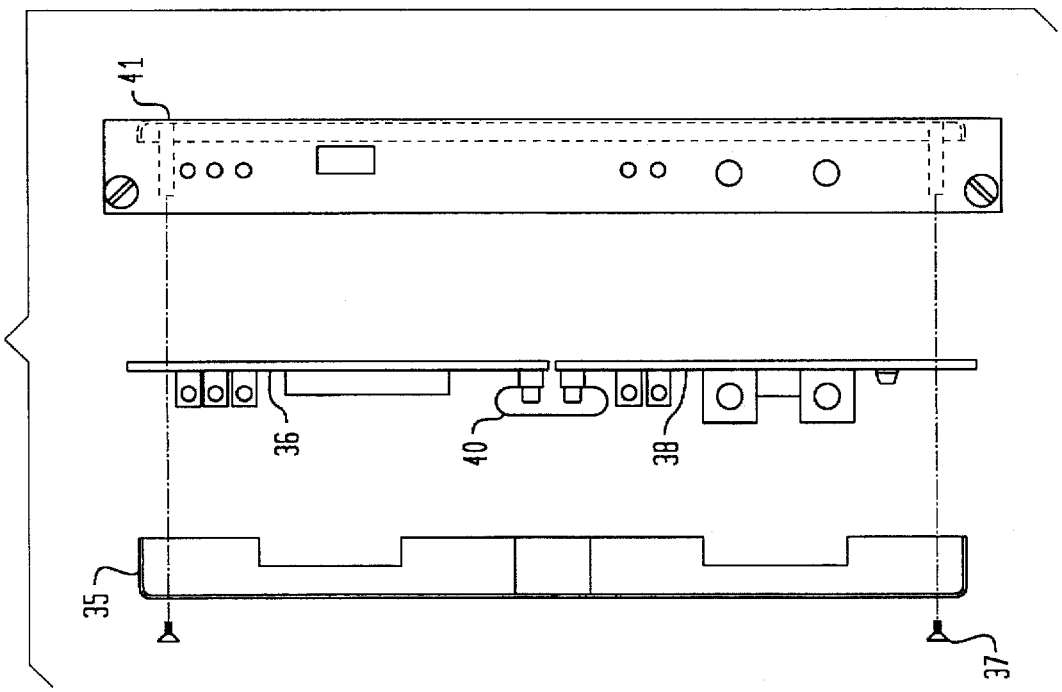
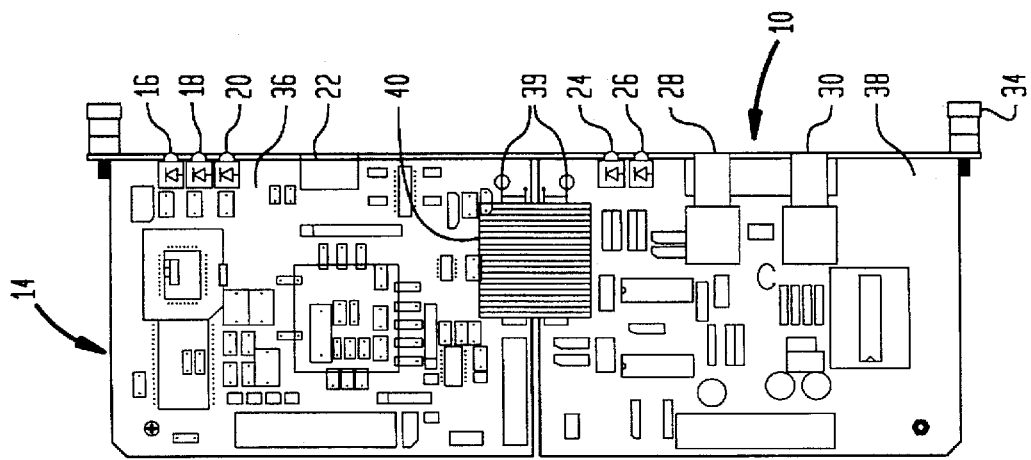

FIG. 4
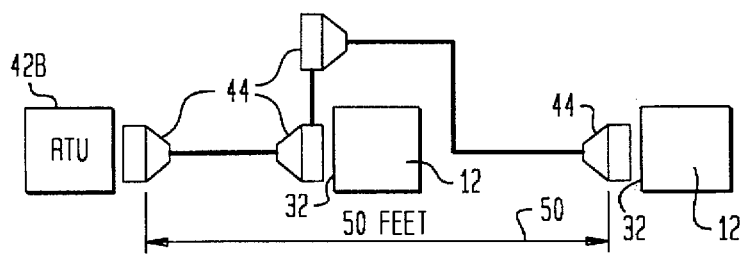
FIG. 5
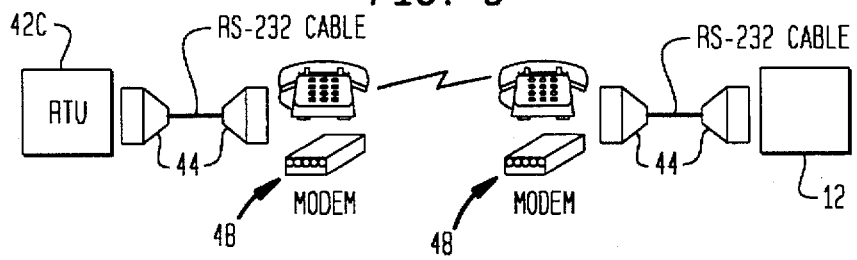
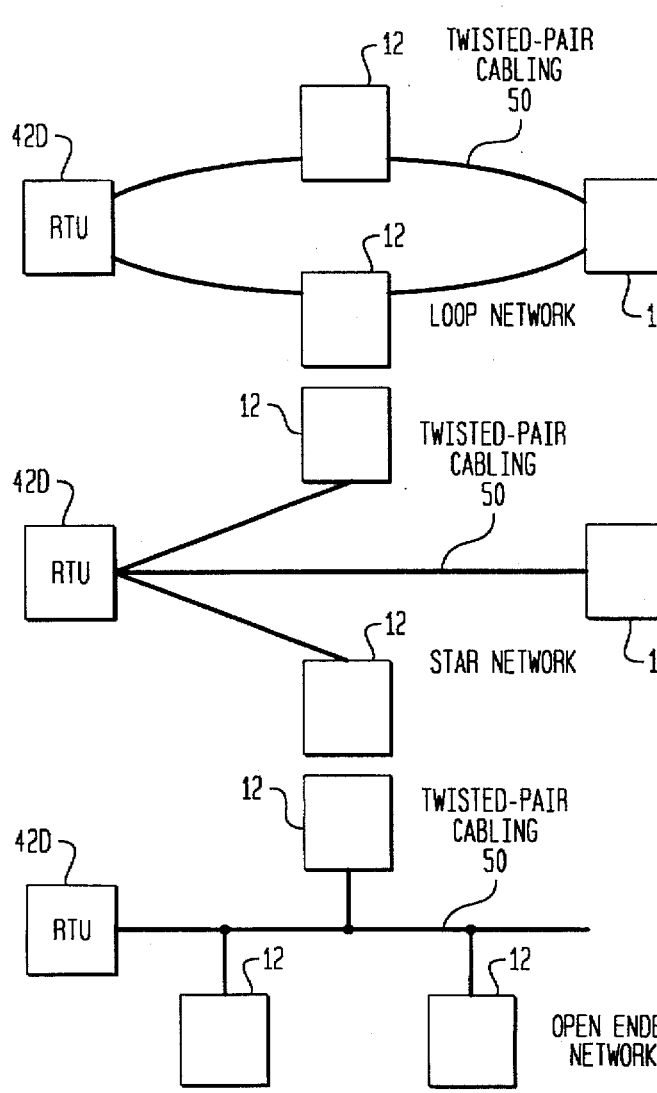
FIG. 6

RECONFIGURABLE COMMUNICATIONS MODULE

CROSS-REFERENCE TO RELATED APPLICATION

This is a continuation of Ser. No. 08/414,066 filed Mar. 31, 1995, now abandoned.

FIELD OF THE INVENTION

This invention relates, generally, to communications modules and more particularly to a communication module in which the physical link may be reconfigured to a fiber-optic or other communication medium interface which may be used with voltage regulator controllers and other power and distribution control apparatus.

SUMMARY OF THE INVENTION

It is well known that there is an increasing tendency to provide communications capabilities with and between power distribution and control apparatus. Typically, such distribution and control apparatus includes power circuit breakers, switchgear, transformer tap systems, voltage regulator controllers and the like. Such communication schemes typically include interconnection between controllers, controller to supervisory device (RTU) or a combination of the above in a network configuration.

Therefore, it is necessary for any controller or distribution equipment to have an appropriate communications module adapted to the medium or connection scheme contemplated as well as the appropriate protocol scheme. This module typically allows for communication between proprietary communications schemes inherent in a particular controller. Therefore, an additional component must be added to any communications module inherent in a controller to thereafter allow direct interfacing through standard physical interfaces and communications protocols. In this regard, typical physical interfaces may use RS-232 or RS-485 electrical wire connections or different communication media such as fiber optic transmission.

Unfortunately, it has been found that various physical interfaces and communications protocols are frequently used, all of which require completely different communication modules in order to adapt to particular interface requirements. This necessarily increases engineering and manufacturing costs as well as the requirements for inventory and the like.

Accordingly, it is desirable to provide a communication module which lowers the amount of engineering and manufacturing costs. It is also desirable and yet another object of the present invention to produce a communications module which reduces inventory count.

Still another object and desirable feature is to have a communications module which is reconfigurable to accommodate different communications protocol schemes or physical interface. It would also be advantageous and is an object of the present invention to produce a communications module whereby only substitution of a sub-component facilitates communication over different physical link/ transmission media while the remainder of the unit which actually interacts with the power control apparatus remains the same. It is also an object of the present invention to produce a communications module which has inherent therein a plurality of communications protocols thereby allowing selection from a predetermined menu without changeout of the communications module.

It is yet another object of the present invention and it is also desirable to produce a reconfigurable communication module for facilitating communication to or between electric power control apparatus, comprising a reconfigurable communication module adaptable to communicate over a plurality of communication mediums, the reconfigurable communication module connectable to the electric power control apparatus, module communication processor board contained in the communication module for communicating with electric power control apparatus and for also communicating with one of a group of replaceable module transceivers, a replaceable module transceiver board contained in the communication module for communicating with the module communication processor board and for facilitating external communication over a predetermined communications medium, the replaceable module transceiver board consisting of one of a group of replaceable module transceiver boards, wherein each of the group of replaceable module transceiver boards is adapted to communicate over a different communications medium or physical interface.

DESCRIPTION OF THE DRAWINGS

Reference may now be had to the accompanying Figures in which:

FIGS. 2A, 2B and 2C are elevational views of the construction of the communication modules according to the present invention;

FIG. 4 is a block diagram indicating interconnection of RS-232 based communication modules according to the present invention;

FIG. 5 is a modem based communication scheme according to the communication module of the present invention; and FIG. 6 are exemplary block diagrams of different RS-485 network configurations utilizing the communication module according to the present invention.

DETAILED DESCRIPTION OF THE PREFERRED EMBODIMENT

Figure 1A:
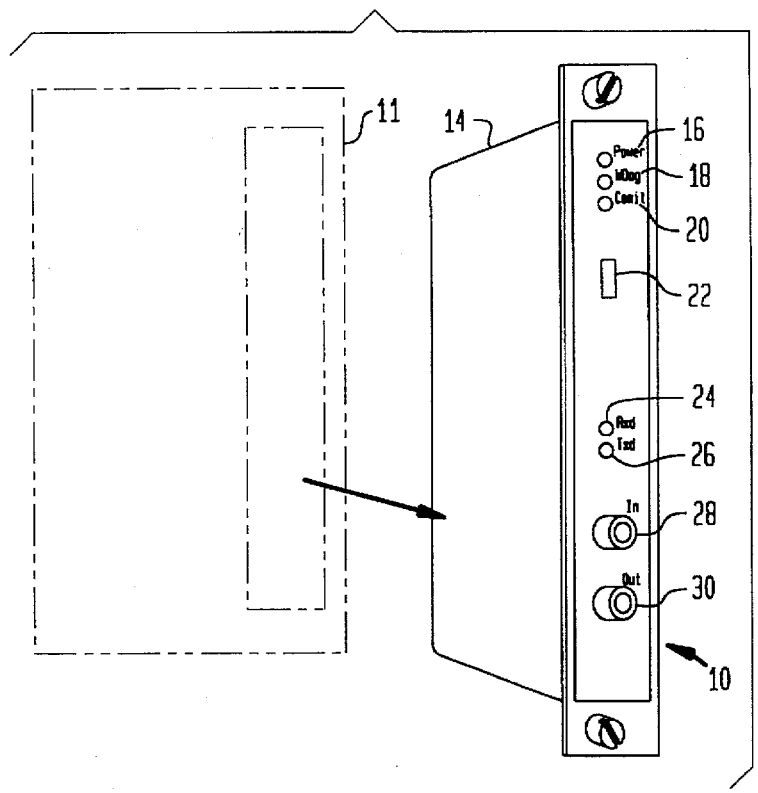
FIGS. 1A and 1B are perspective views of a fiber optic and wire based module respectively according to the present invention.
Figure 1B:
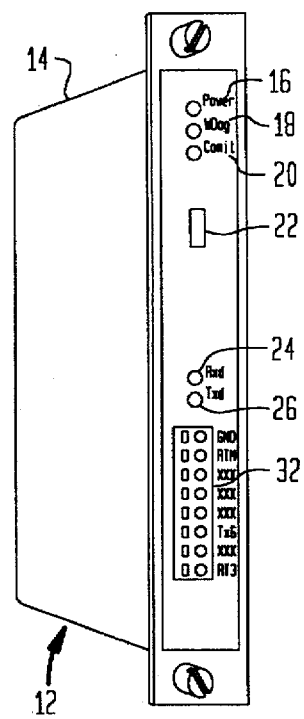

Referring now to FIGS. 1A and 1B there is shown communication modules 10, 12 for fiber optic and wire interconnection respectively according to the present invention. Preliminarily, it is to be understood that communication between power distribution and control apparatus and supervisory computers and/or other power control apparatus is extremely important for a variety of reasons, such reasons typically including load shedding, load management, process control and the like. However, it has frequently been found that such communication is not always between the same type of equipment or produced by the same manufacturer. Therefore, standard protocol schemes are frequently utilized. Further, physical plant requirements require the use of different types of interconnection methods or media (sometimes referred to as physical links) such as hard wire or fiber optic interconnection in a variety of configurations as described more fully below with respect to FIGS. 3–6. In any event, it is effectively required that a manufacturer have a communication module which is not only interconnectable with a particular piece of control apparatus, but a multitude of such modules having different configurations. Therefore, different situations and equipment typically require different physical links (i.e., hard-wire e.g. RS-232 or RS-485, fiber optic, RF, light such as infrared) and different software based protocol schemes.

It has also been found that there are certain requirements which are basic to each communication module regardless of the interconnection modality and thereby it is only necessary to adapt or modify the transceiver to the particular physical or link layers.

Therefore, in the preferred embodiment of the present invention a communication module 10, 12 is preferably utilized with a voltage regulator control panel or tap changer. However, it is to be understood that other types of power control apparatus may also be utilized therewith such as, for example, circuit breakers, switchgear, current interrupters and the like. Accordingly, each communication module 10, 12 is comprised of a communication module housing 14 which is sized and configured so as to be insertable into an exemplary voltage regulator control panel 11 which is shown in phantom.

Disposed on the face of each module 10, 12 are a plurality of indicators. In this regard, indicator light 16 is preferably an LED which indicates that the communication module 10, 12 is receiving power. Watch dog (Wdog) indicator 18 is configured so that when blinking steadily, it indicates that the communication module 10, 12 microprocessor and software are functioning properly. Communication light 20 indicates that communication activity is actually taking place with modules 10, 12. Test connector 22 is utilized to communicate with and test the communication module and at the particular piece of equipment and in the preferred embodiment of the present invention is a standard subminiature connector. However, since such type of features are readily known and understood to one skilled in the art, a more detailed description will not be had. Also on the face of each communication module 10, 12 are receive (RxD) and transmit (Txd) indicators 24, 26 which indicate respectively that the communication module 10, 12 is receiving or transmitting data.

It is to be understood that indicators 16-20, 24, and 26 are commonly used in the industry to provide supervisory annunciation capability to a module such as the communication module of the present invention and therefore a more detailed description will not be had.

In the preferred embodiment of the present invention there are a number of transmission medium methods which may be utilized. Accordingly, fiber optic communication module 10 has disposed on the front thereof fiber optic input and fiber optic output connectors 28, 30 respectively which facilitate communication over a fiber optic media as described more fully below. Similarly, RS-232/485 communication module 12 has disposed on the face thereof a terminal block connector 32 which provides communication according to RS-232 and 485 interface schemes over a wire medium. However, it is to be understood that other physical interfaces can be utilized without departing from the spirit and scope of the present invention.

Further, as can be seen from viewing FIGS. 1A and 1B, the overall dimensions and functionality of communication modules 10, 12 are identical with the exception of the transmission medium (physical link) utilized.

Referring now to FIGS. 2A, 2B and 2C there is shown elevational views of the fiber optic communication module 10 of the present invention. In this regard, FIG. 2A illustrates the use of two circuit boards in order to form the communication module of the present invention. More particularly, shown is a communication board 36 which may also be referred to as a microprocessor board and a transceiver or fiber optic board 38. Connecting the two boards 36, 38 together is cable 40. In the preferred embodiment of the present invention microprocessor board 36 is used with all communication modules (i.e., fiber optic communication module 10, RS-232/485 communication module 12 or a wireless module—not shown).

Microprocessor board 36 connects directly to the voltage regulator controller 11 (shown in phantom in FIG. 1A) or would interconnect directly with any other distribution control apparatus and in essence operates as an interface between transceiver board 38 and the distribution and control apparatus (not shown). In this fashion, communication module housing 14 stays the same size and configuration regardless of the communication module utilized and only the transceiver board 38 is changed to fit the various physical links or mediums utilized for communication purposes. A faceplate 46 (FIG. 2C) is specifically configured to suit the different transceivers 38 utilized. Moreover, although not required, in the preferred embodiment of the present invention, the communication module housing 14 is inserted into a "rack" style chassis, sometimes referred to as an expansion rack which is part of the voltage regulator controller 11. This therefore allows communication module 14 to be more easily field installable and interchangeable.

Moreover, by use of the above features, substantial cost and logistic savings are realized since an end user may change the transceiver 38 in the field if so desired without purchasing or replacing the entire communication module or voltage regulator controller 11. This is particularly advantageous to affect repairs due to the "modularity" of the communication module. The transceiver 38 as well as microprocessor board 36 are connected to housing frame 41 by use of board fasteners 39, while module end cover 35 which is fastened to housing frame 41 by module end cover screws 37 encloses the microprocessor and transceiver boards 36, 38. The entire module 10 is fastened by module fasteners 34 to the enclosure encompassing the voltage regulator controller or distribution equipment (not shown).

Additionally, in the preferred embodiment of the present invention, microprocessor board 36 has embedded therein a number of different communications protocols such as, for example, DNP 3.0. These different protocols are selected or enabled by the processor inherent in Regulator Control Panel 11 (power distribution processor not shown). Therefore, by communication directly with Panel 11, the microprocessor board 36 is "directed" to enable the desired protocol. However, it is to be understood that in alternate embodiments, the "selection" may be made by directly communicating with the microprocessor board 36 or, for example, by specific jumper selection, etc. without departing from the spirit and scope of the present invention.

Figure 3:
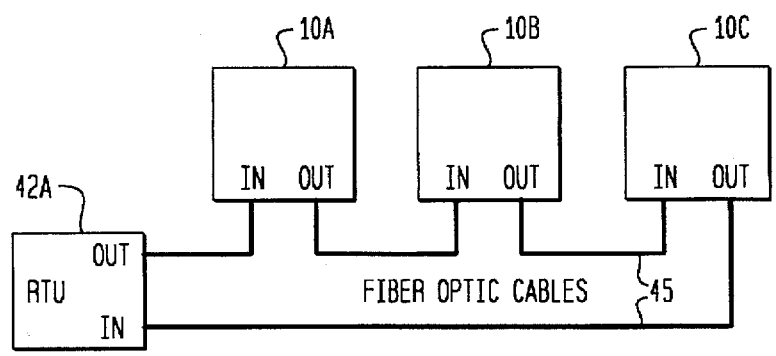
FIG. 3 is a block diagram representation of a fiber optic communication link according to the present invention.

Referring now to FIGS. 3, 4, 5 and 6 there are shown different interconnecting schemes for use with the present invention. Accordingly, FIG. 3 shows the looping of a plurality of fiber optic communication modules 10a, 10b and 10c by use of fiber optic cable 45 which cooperates with remote terminal unit (RTU) 42a. It is to be understood that in the preferred embodiment of the present invention the RTU such as RTU 42a may be any supervisory device, such as a computer or the like which collects, interrogates or processes the data communicated to and from each communication module. Such RTUs are readily known and available to one skilled in the art and therefore a further description will not be had. As previously recited, a fiber optic communication module 10 is available in order to provide communications in electrically noisy environments, over significant distances or the like.

Similarly, different operating environments or physical spacing/distance requirements dictate different types of mediums or physical links as well as communications protocols. These become evident when considering, for example, the physical link found in the RS-232 type interface such as found in FIG. 4 whereby simple wires use standard connectors 44 where RS-232 limits the distance to a length of (50) feet. Alternatively, through use of modems 48 such as found in FIG. 5, RTU 42c may communicate to a communication module 12 over any desired length.

Referring to FIG. 6, the use of an RS-485 physical link is shown which thereby allows interconnection to a plurality of communication modules 12 in a plurality of networks such as a LOOP network, a STAR network or an OPEN-ENDED network as desired. In this manner, RTU Units 42d can communicate over twisted pair or other suitable cabling as desired without departing from the spirit and scope of the present invention.

It is to be understood that many variations of the present invention may be practiced without departing from the spirit and scope of the present invention. For example, different modes of connection other than a ribbon cable may be facilitated between the microprocessor board and the transceiver board. Further, different indicator lights may be utilized while, a different communication medium such as wireless or communication over light (i.e. infrared) may be used rather than a fiber optic or RS-232/485 Type module as shown. Accordingly, it is to be understood that the present invention is not to be limited by the specific embodiments described herein but rather by the claims appended hereto.

What is claimed is:

1. A reconfigurable communication module for facilitating communication to or among electric power control apparatus, comprising:

a reconfigurable communication module adaptable to communicate over a plurality of communication media, said reconfigurable communication module connectable to and collocated with said electric power control apparatus;

module communication means contained in said communication module for communicating with said electric power control apparatus and for also communicating with one of a group of replaceable module transceivers;

a plurality of communications protocols embedded in said reconfigurable communications module, wherein the module communication means includes means responsive to said electric power control apparatus for selecting one of the plurality of communications protocols to be used for communicating with said electric power control apparatus;

replaceable module transceiver means contained in said communication module for communicating with said module communication means and for facilitating external communication over a predetermined communications medium, said replaceable module transceiver means consisting of one of a group of replaceable module transceiver means, wherein each of said group of replaceable module transceiver means is adapted to communicate over a respectively different one of said communications media.

2. A device according to claim 1 wherein said replaceable module transceiver means is adapted so as to communicate over a fiber optic cable.

3. A device according to claim 1 wherein said replaceable module transceiver means is adapted to communicate over an electrical wire.

4. A device according to claim 1 wherein said replaceable module transceiver means is adapted to communicate via Radio Frequency modulated signals.

5. A device according to claim 1 wherein said replaceable module transceiver means is adapted to light based communication.

6. A device according to claim 3 wherein said communication via an electrical wire is RS-232 and RS-485 based.

7. A device according to claim 1 further comprising a second reconfigurable communication module, connected by one of said communication mediums to the first reconfigurable communication module.

8. A device according to claim 1 further comprising a supervisory remote terminal unit, said supervisory remote terminal unit connected by one of said communication mediums to said reconfigurable communication module.

9. A device according to claim 1 wherein said electric power control apparatus is a voltage regulator controller.

10. A device according to claim 1 wherein said electric power control apparatus is a load tap changer controller.

11. A device according to claim 1 wherein said electric power control apparatus is a switchgear controller.

12. A device according to claim 1 wherein said electric power control apparatus is a circuit breaker.

13. A device according to claim 5 wherein said replaceable module transceiver means is adapted to communicate using infared light.

14. A device according to claim 1 wherein said reconfigurable communication module is disposed in a housing and wherein said housing is configured so as to be insertable into an expansion rack contained in an electric power control apparatus.

15. A device according to claim 14 wherein said electric power control apparatus is a voltage regulator controller.

16. A reconfigurable communication module for facilitating communication to or among electric power control apparatus, comprising:

a reconfigurable communication module adaptable to communicate over a plurality of communication media, said reconfigurable communication module connectable to and collocated with the electric power control apparatus;

module communication means contained in said communication module for communicating with the electric power control apparatus and for also communicating with one of a group of replaceable module transceivers;

a plurality of communications protocols embedded in said reconfigurable communications module, wherein one of the plurality of communications protocols to be used for communicating with the electric power control apparatus is selected by one or more jumper selections;

replaceable module transceiver means contained in said communication module for communicating with said module communication means and for facilitating external communication over a predetermined communications medium, said replaceable module transceiver means consisting of one of a group of replaceable module transceiver means, wherein each of said group of replaceable module transceiver means is adapted to communicate over a respectively different one of said communications media.

17. A device according to claim 16 wherein said replaceable module transceiver means is adapted so as to communicate over a communication means selected from a group consisting of:

fiber optic cable communications means;
RS-232 communication means;
RS-485 communication means;
radio Frequency communications means; and
infrared light based communications means.

18. A device according to claim 16 further comprising a second reconfigurable communication module, connected by one of said communication media to the first reconfigurable communication module.

19. A device according to claim 16 further comprising a supervisory remote terminal unit, said supervisory remote terminal unit connected by one of said communication media to said reconfigurable communication module.

20. A device according to claim 16 wherein said electric power control apparatus is selected from a group consisting of:
a voltage regulator controller;
a load tap changer controller;
a switchgear controller; and
a circuit breaker.

* * * * *